(12) United States Patent
Kile (10) Patent No.: US 11,252,858 B2
(45) Date of Patent: Feb. 22, 2022

(54) AGRICULTURAL SEEDER IMPLEMENT INCLUDING SEED BOOT WITH RAMPED SEED-CONVEYING CHANNEL

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 201 days.

(21) Appl. No.: 16/037,151

(22) Filed: Jul. 17, 2018

(65) Prior Publication Data

US 2020/0022302 A1   Jan. 23, 2020

(51) Int. Cl.
| | | |
|---|---|---|
| *A01C 7/08* | (2006.01) | |
| *A01C 7/20* | (2006.01) | |
| *A01C 5/06* | (2006.01) | |

(52) U.S. Cl.
CPC ............. *A01C 7/082* (2013.01); *A01C 5/062* (2013.01); *A01C 7/084* (2013.01); *A01C 7/206* (2013.01)

(58) Field of Classification Search
CPC .......... A01C 5/062; A01C 7/206; A01C 7/082
See application file for complete search history.

(56) References Cited

U.S. PATENT DOCUMENTS

| 6,405,665 | B1 * | 6/2002 | Henry | .................... | A01C 5/062 |
| | | | | | 111/124 |
| 9,374,943 | B1 * | 6/2016 | Kile | ........................ | A01B 49/06 |
| 9,750,175 | B1 * | 9/2017 | Wickstrom | .............. | A01C 7/06 |

* cited by examiner

*Primary Examiner* — Alicia Torres
(74) *Attorney, Agent, or Firm* — Parsons & Goltry, PLLC; Michael W. Goltry; Robert A. Parsons (57) ABSTRACT

An agricultural seeder implement includes a seed boot connected to an opener. The seed boot includes a channel extending from an inlet to an outlet behind a leading extremity of the opener, a deflecting surface facing downwardly into the channel toward the outlet, and a ramp facing inwardly into the channel between the inlet and the outlet. The opener is for cutting a furrow in the ground by the leading extremity ahead of the outlet, and the channel is for guiding a stream of air-driven seed forwardly therethrough from the inlet and downwardly into the furrow through the outlet, wherein the ramp is in-turned toward the deflecting surface for deflecting the stream of air-driven seed through the channel inwardly to the deflecting surface, and the deflecting surface is for deflecting the stream of air-driven seed received from the ramp downwardly to and through the outlet into the furrow.

16 Claims, 6 Drawing Sheets

AGRICULTURAL SEEDER IMPLEMENT INCLUDING SEED BOOT WITH RAMPED SEED-CONVEYING CHANNEL

FIELD OF THE INVENTION

The present invention relates to agricultural implements and, more particularly, to agricultural seeder implements.

BACKGROUND OF THE INVENTION

In an agricultural air seeder, seeds are conveyed by an air stream from a central hopper to a number of seeding elements, carried by a frame, that inject the seed into furrows cut into the ground by ground cutting elements. Air seeders of this type use a plate or a cutting sweep carried at each of the seeding elements by the frame that cuts a furrow in the ground into which the seeds are deposited. The depth of seeding is of fundamental importance to seed germination and must be accurately controlled. The seed must be properly placed at a preselected spacing from the soil surface dependent upon soil surface and sub-surface moisture conditions to achieve optimum seed germination. Although skilled artisans have developed varieties of agricultural air seeders designed to attempt to improve controlled seeding depth, advances in the field of air seeders have not been entirely satisfactory, and have yielded air seeders that are expensive, difficult to construct, difficult to service, mechanically complex, and which do not adequately provide a consolidated delivery of seeds leading to inherent seed scattering of seed away from the furrow and resultant seed loss, thereby necessitating continued improvement in the art.

SUMMARY OF THE INVENTION

According to the principle of the invention, an agricultural seeder implement includes an opener and a seed boot. The opener includes a leading extremity and a trailing extremity. The seed boot is connected to the opener, and includes a channel extending forwardly through the seed boot from an inlet proximate to the trailing extremity of the opener to an outlet behind the leading extremity of the opener, a deflecting surface facing downwardly into the channel opposing the outlet, and a ramp facing inwardly into the channel between the inlet and the outlet. The opener is for being pulled for cutting a furrow in the ground by the leading extremity ahead of the outlet and the channel for guiding a stream of air-driven seed forwardly therethrough from the inlet and into the furrow through the outlet directed downwardly in the furrow, wherein the ramp is in-turned toward the deflecting surface for deflecting the stream of air-driven seed through the channel inwardly to the deflecting surface away from the outlet, and the deflecting surface is for deflecting the stream of air-driven seed received from the ramp downwardly to and through the outlet into the furrow. The seed boot is removably connected to the opener. The opener is a chisel. The channel is downturned proximate to the outlet for guiding the stream of air-driven seed downwardly into the furrow through the outlet.

According to the principle of the invention, an agricultural seeder implement includes an opener and a seed boot. The opener includes a leading extremity and a trailing extremity. The seed boot is connected to the opener, and includes an inlet proximate to the trailing extremity of the opener and an outlet behind the leading extremity of the opener, a first surface and an opposed second surface that extend from the inlet to the outlet, the first surface and the second surface define a channel through the seed boot from the inlet to the outlet. The opener is for being pulled for cutting a furrow in the ground by the leading extremity ahead of the outlet and the channel for guiding a stream of air-driven seed forwardly therethrough from the inlet and into the furrow through the outlet directed downwardly in the furrow, wherein the second surface is in-turned toward a deflecting surface of the first surface for deflecting the stream of air-driven seed through the channel inwardly to the deflecting surface away from the outlet, and the deflecting surface of the first surface is for deflecting the stream of air-driven seed received from the second surface downwardly to and through the outlet into the furrow. The first surface extends from the inlet to a first edge, the second surface extends from the inlet to a second edge, and the first edge and the second edge define the outlet. The seed boot is removably connected to the opener. The opener is a chisel. The channel is downturned proximate to the outlet for guiding the stream of air-driven seed downwardly into the furrow through the outlet.

BRIEF DESCRIPTION OF THE DRAWINGS

Referring to the drawings.

DETAILED DESCRIPTION

Figure 1:
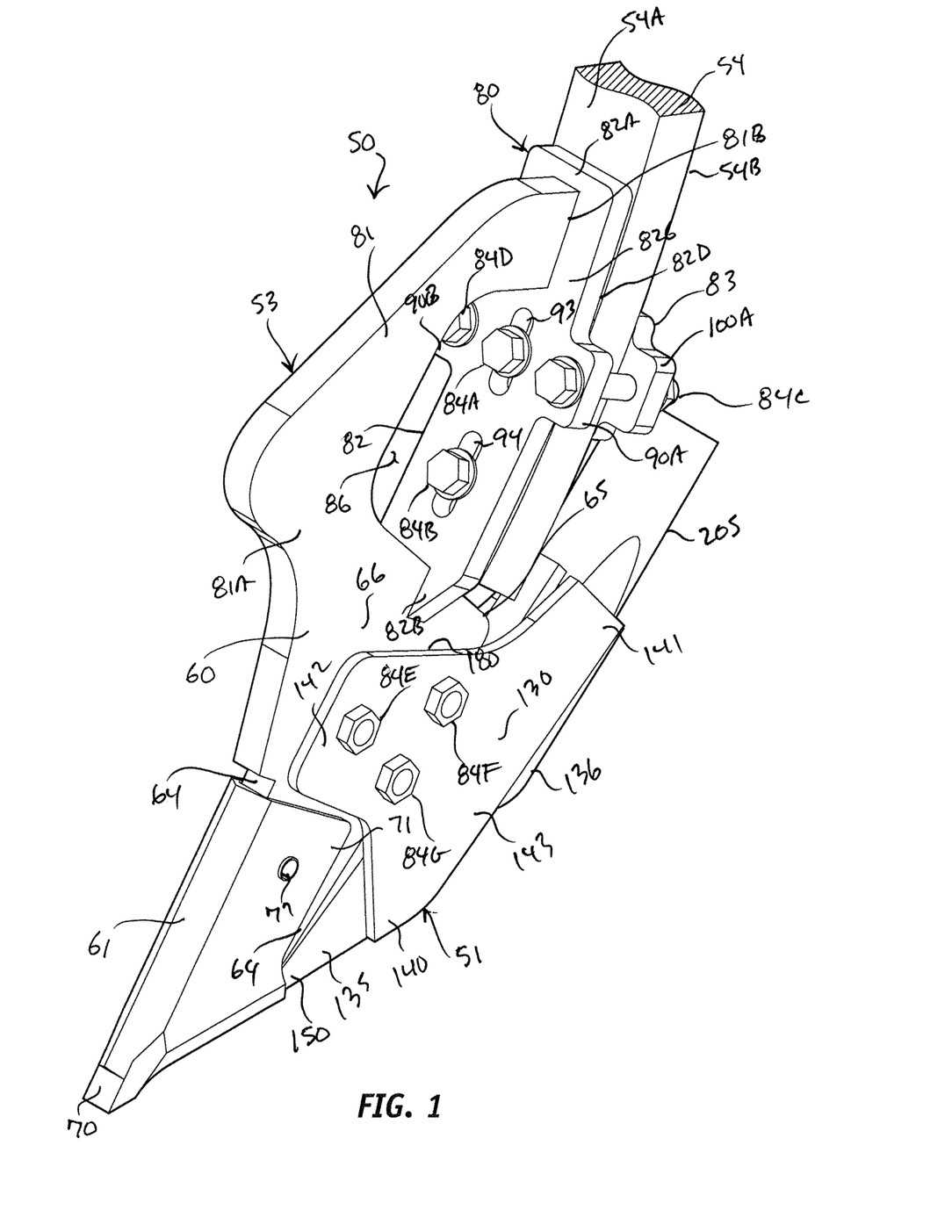
FIG. 1 is a front perspective view of an agricultural seeder implement constructed and arranged in accordance with the principle of the invention, the agricultural seeder implement includes a seed boot connected to an opener, and is shown as it would appear connected to a shank, partially shown, in preparation for use of the agricultural seeder implement for sowing a crop.
Figure 2:
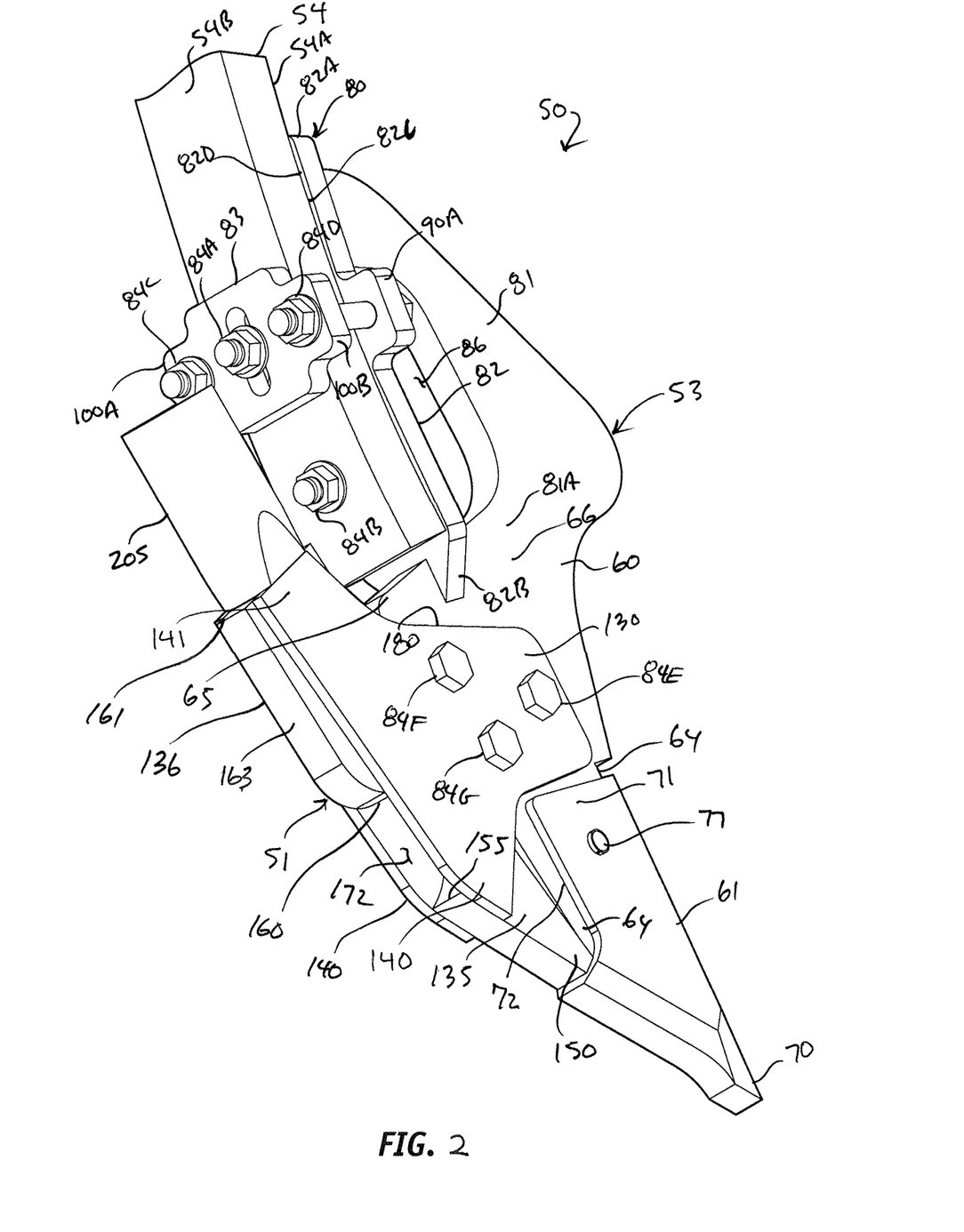
FIG. 2 is a rear perspective view of the agricultural seeder implement of FIG. 1.

Turning now to the drawings, in which like reference characters indicate corresponding elements throughout the several views, attention is first directed to FIGS. 1 and 2 in which there is seen an agricultural seeder implement 50, including seed boot 51 connected to opener 53 and suspended from a shank 54 of a plow frame (not shown) in preparation for use of implement 50 for sowing a crop. Opener 53 is a chisel, which is a form of a non-moving and non-rotating opener for being advanced, i.e. pulled, by a tractor for cutting a furrow in the ground at a preselected depth from the surface of the ground, and seed boot 51 connected to opener 53 is for receiving a stream of air-driven seed and depositing said stream of air-driven seed into the furrow formed by opener 53.

Figure 3:
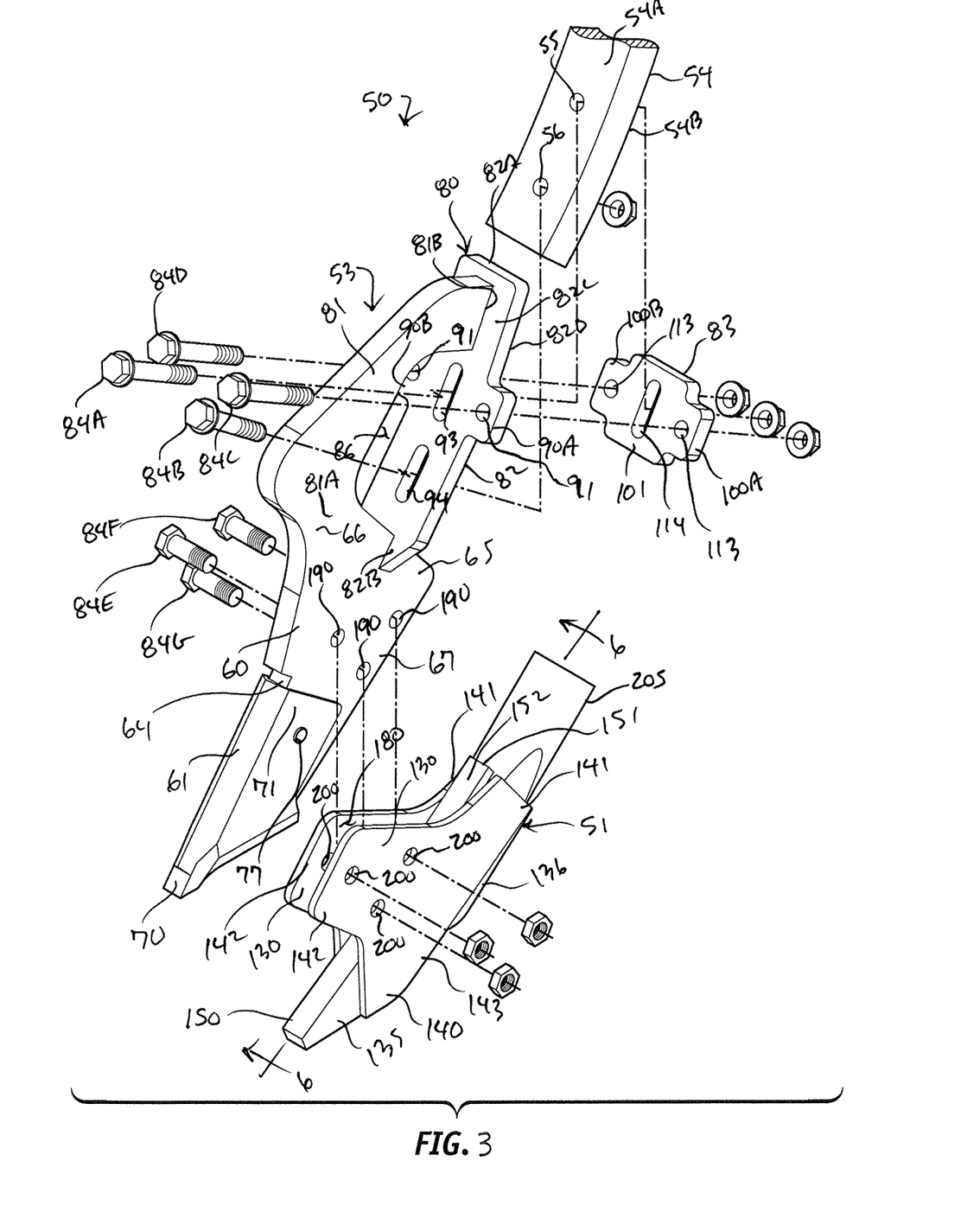
FIG. 3 is a front exploded perspective view of the agricultural seeder implement of FIG. 1.
Figure 4:
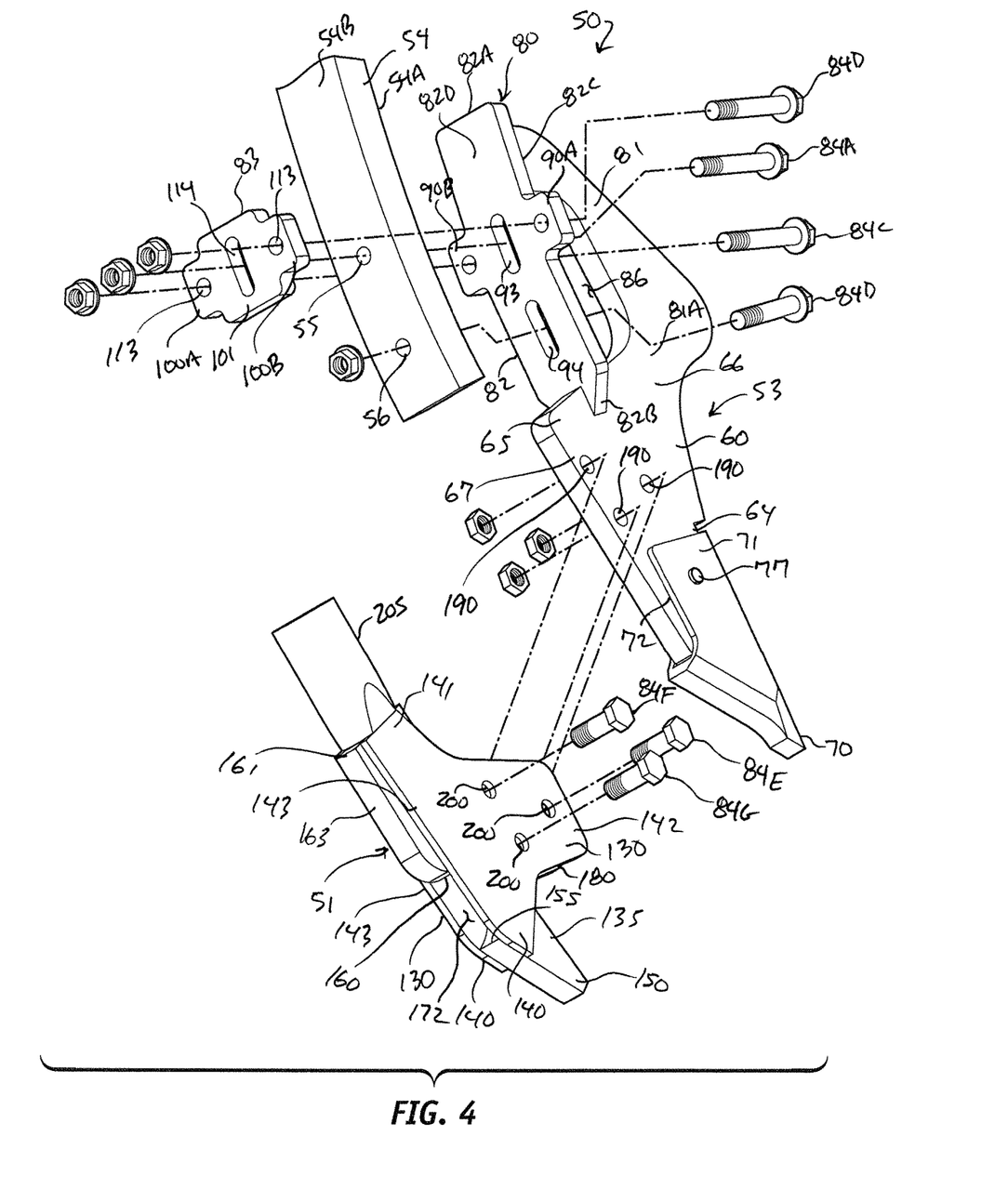
FIG. 4 is a rear exploded perspective view of the embodiment of FIG. 3.

Opener 53 is an assembly of blade or plate 60 and cutting head 61. In FIGS. 3 and 4, plate 60 is flat and straight in a vertical direction, and is stout, strong, robust, and of substantial construction being formed of steel or other metal having inherently strong and resilient material characteristics. Plate 60 includes leading extremity 64, trailing extremity 65, and upper extremity 66 and lower extremity 67 that extend between leading extremity 64 and trailing extremity 65.

Cutting head 61 is stout, strong, robust, and of substantial construction like that of plate 60, being formed of cast iron in this example or other selected metal material having inherently strong and resilient material characteristics, and is structured to be attached to, and carried by, leading extremity 64 of plate 60 shown in FIGS. 1 and 2. In FIGS. 1-4, cutting head 61 has leading extremity 70, which is a wedge-like cutting edge to cut into the ground, and trailing extremity 71 that is adapted to be connected to leading extremity 64 of plate 60 of opener 53. In FIGS. 2 and 4, slot 72 in trailing extremity 71 accepts leading extremity 64 of plate 60. Cutting head 61 is removably attached to leading extremity 60 with spring pin 77, also called a tension pin or a roll pin, which is received in appropriate holes through trailing extremity 71 of cutting head 61 and leading extremity 64 of plate 60. Conventionally, spring pin 77 has a body diameter which is larger than the hole diameter of the appropriate holes formed in trailing extremity 71 of cutting head 61 and the hole diameter of a corresponding appropriate hole formed in leading extremity 64 of plate 60. Spring pin 77 is driven through the holes in trailing extremity 71 of cutting head 61 and leading extremity 64 of plate 60, and the spring action of spring pin 77 allows it to compress as it assumes the hole diameters of the respective holes. The radial force exerted by spring pin 77 against the hole walls of the respective holes concurrently retains it in the holes, in which spring pin 77 acts as a self-retaining fastener releasably or otherwise removably connecting cutting head 61 to leading extremity 64 of plate 60. The described connection of cutting head 61 to plate 60 is a non-destructive releasable or removable coupling/connection, which allows cutting head 61 to be removed from leading extremity 64 of plate 60, such as for replacement or repair, simply by reversing the installation operation by forcibly removing spring pin 77 from the respective holes, such as with a hammer or ram, and separating cutting head 61 from leading extremity 64 of plate 60, all without the need to destroy cutting head 61 or plate 60 in the detaching process. The assembly of cutting head 61 and plate 60 form opener 53. When so assembled, leading extremity 70 of cutting head 61 defines the leading extremity of opener 53, and trailing extremity 65 of plate 60 defines the trailing extremity of opener 53.

In FIGS. 1 and 2, implement 50 includes buckle assembly 80 that is used to connect implement 50 to shank 54. Buckle assembly 80 connects upper extremity 66 of plate 60 of opener 53 to shank 54 to connect implement 50 to shank 54. In FIGS. 1-4, buckle assembly 80 includes arm 81, bracket 82, coupling 83, and conventional nut-and-bolt assemblies 84 for fastening together shank 54, bracket 12 and coupling 53.

Arm 81 and bracket 82 are parts of plate 60, are fashioned of the same material as plate 60, are extensions of upper extremity 66 and trailing extremity 65, respectively, of plate 60, and extend upright and outwardly from upper extremity 66 and trailing extremity 65, respectively. Bracket 82 has upper end 82A, lower end 82B, front face 82C, and rear face 82D. Arm 81 has lower end 81A that is integrally formed with upper extremity 66 of plate 60. Arm 81 extends upwardly from lower end 81A at upper extremity 166 of plate 60 and curves rearwardly to upper end 81B, which is rigidly connected via welding to front face 82C of bracket 82 proximate to upper end 82A. Bracket 82 depends downwardly from upper end 82A to lower end 82B rigidly connected via welding to trailing extremity 65 of plate 60 between upper extremity 66 and lower extremity 67. Arm 81 and bracket 82 encircle opening 86 that extends from upper ends 81B and 82A and lower ends 81A and 82B. Opening 86 facilitates the installation of nut-and-bolt assemblies 84A and 84B as described below. The open structure formed by arm 81 and bracket 82 imparts structural rigidity and strength to buckle assembly 80.

Referring in relevant part to FIGS. 3 and 4, bracket 82 has tabs 90A and 90B that extend outwardly from either side of bracket 82 between upper end 81B of arm 81 connected to upper end 82A of bracket 82, and lower end 82B of bracket 82. A bolt hole 91 extends through each one of tabs 90A and 90B from front face 82C of bracket 82 to rear face 82D of bracket 82. A pair of upper and lower elongate bolt holes 93 and 94 extend through bracket 82 from front face 82C to rear face 82D. Upper and lower elongate bolt holes 93 and 94 are formed in bracket 82 between upper end 81B of arm 81 connected to upper end 82A of bracket 82, and lower end 82B of bracket 82. Bolt holes 91 are horizontally aligned, upper elongate bolt hole 93 is located between bolt holes 91 and above lower elongate bolt hole 94, and upper and lower elongate bolt holes 93 and 94 are vertically aligned.

In FIGS. 3 and 4, shank 154 has front face 54A, rear face 54B, and a pair of upper and lower bolt holes 55 and 56 that extend through shank 54 from front face 54A to rear face 54C. Coupling 83 has tabs 100A and 100B formed on either side of a middle 101. A bolt hole 113 extends through each of tabs 100A and 100B, and elongate bolt hole 114 extends through middle 111. Elongate bolt hole 114 extends in a vertical direction, and is located between bolt holes 113, which are horizontally aligned.

To fasten implement 50 to shank 54 with buckle assembly 80, rear face 82D of bracket 82 is positioned directly against one side of shank 54 axially aligning upper and lower elongate bolt holes 93 and 94 of bracket 82 with the respective upper and lower bolt holes 55 and 56 of shank 54. Coupling 83 is, in turn, positioned directly against the opposite side of shank 54 to axially align bolt holes 113 of tabs 100A and 100B that extend outwardly from either side of shank 154 with corresponding bolt holes 191 of tabs 90A and 90B of bracket 82 that extend outwardly from either side of shank 54, and to axially align elongate bolt 114 in middle 111 of coupling 83 with upper elongate bolt hole 93 of bracket 82. Nut-and-bolt assemblies 84A-84B are then installed to fasten buckle assembly 80 to shank 54 for removably connecting implement 50 to shank 54. Nut-and-bolt assembly 184A is applied through upper elongate bolt hole 93 of bracket 82, upper bolt hole 55 of shank 54, and elongate bolt hole 114 formed in middle 111 of coupling 83, nut-and-bolt assembly 84B is applied to lower elongate bolt hole 94 of bracket 82 and through lower bolt hole 56 of shank 54, nut-and-bolt assembly 84C on the outer side of shank 54 is applied to bolt hole 91 of tab 90A of bracket 82 and bolt hole 113 of tab 100A of coupling 83, and nut-and-bolt assembly 84D on the opposed outer side of shank 54 is applied to bolt hole 91 of tab 90B of bracket 82 and bolt hole 113 of tab 100B of coupling 83. All nut-and-bolt assemblies 84 are conventionally tightened thereby clamping shank 154 between rear face 82D of bracket 82 and coupling 83. The described fastening of buckle assembly 80 to shank 54 via nut-and-bolt assemblies 84 firmly and removably/releasably connects implement 50 to shank 54 to suspend implement 50 from shank 54 in FIGS. 1 and 2. To detach implement 50 from shank 54, such as for repair, maintenance, or replacement, the described operation of connecting implement 50 to shank 54 need only be reversed.

Figure 5:
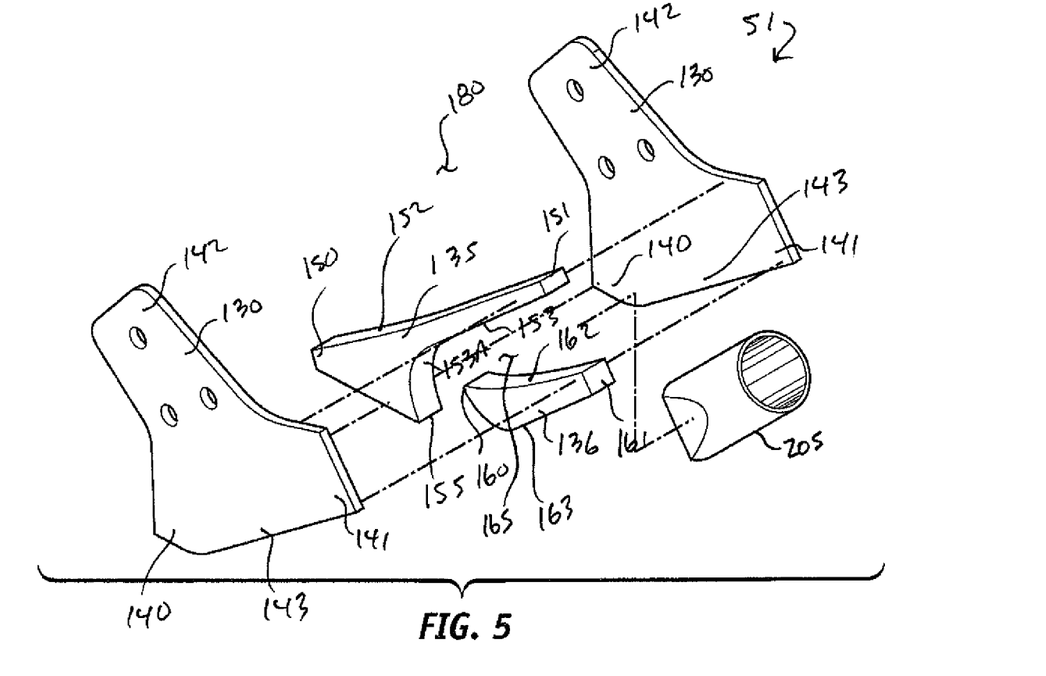
FIG. 5 is an exploded view of the seed boot of the agricultural seeder implement of FIG. 1.

In FIGS. 3, 4, and 5, seed boot 51 is elongate and is stout, strong, robust, and of substantial construction being formed of steel or other metal having inherently strong and resilient material characteristics. Seed boot 51 includes opposed, parallel and identical side sheets 130 rigidly affixed to either side of base 135 and ramp 135. In FIG. 5, each side sheet 130 has leading end 140, trailing end 141, upper end 142, and lower end 143. Base 135 is an elongate member and includes leading end 150, trailing end 151, upper surface 152 and lower surface 153. Lower surface 153 extends forwardly toward leading end 150 from trailing end 141 to edge 155 between leading end 150 and trailing end 151. Lower surface 153 extends linearly from trailing end 151 toward leading end 150 to an intermediate location between leading end 150 and trailing end 151 where it curves downwardly to edge 155. The portion of lower surface 153 that is downwardly curved toward edge 155 is a deflecting surface of lower surface 153 that is denoted at 153A. Ramp 136 is also an elongate member that is much shorter than base 135 and includes leading end 160, which is an edge, trailing end 161, and upper or ramp surface 162 and lower surface 163. Upper surface 162 and lower surface 163 concurrently extend forwardly from trailing end 161 to leading end 160. Upper surface 162 is curvilinear, in which it extends curvilinearly and upturns, being an upturned curvilinear ramp, from trailing end 161 to leading end 160.

Figure 6:
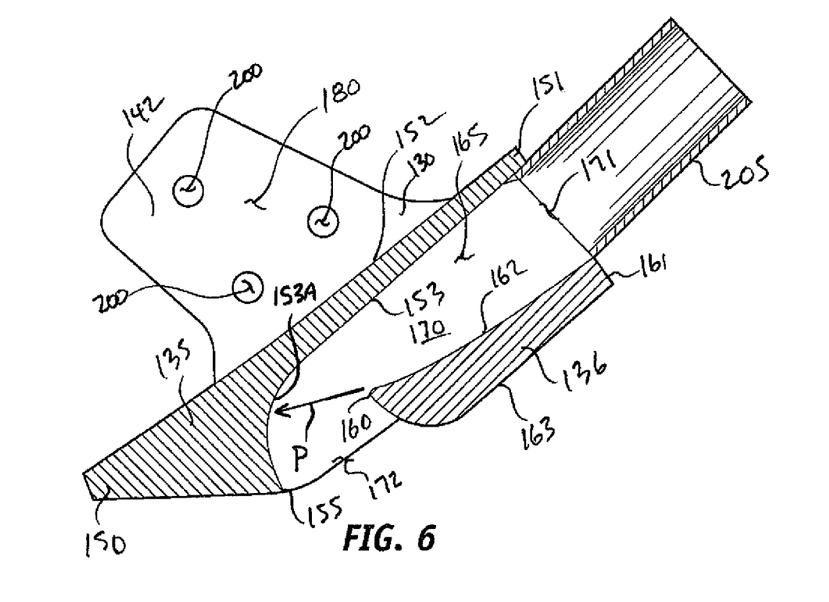
FIG. 6 is section view taken along line 6-6 of FIG. 3.

The orientation of base 135 and ramp 135 and 136 in boot 51 is as follows. In FIGS. 5 and 6, base and ramp 135 and 136 are upright from their respective lower surfaces 153 and 163 to their respective upper surfaces 152 and 162, are axially aligned in a vertical direction, and concurrently extend in the same direction forwardly from their respective trailing ends 151 and 161 to their respective leading ends 150 and 160. Base 135 is spaced apart above ramp 136, and trailing extremities 151 and 161 are spaced apart and axially aligned. Ramp 136 extends under upper surface 153 from its trailing end 161 to its leading end 160 short of and to the rear of both deflecting surface 153A and edge 155, and lower surface 153 of base 135 faces upper surface 162 of ramp 136 to form a space or gap 165 therebetween that extends forwardly from trailing extremities 151 and 161 to the rear of both deflecting surface 153A and edge 155 where leading end 160 of ramp 136 terminates. Being curvilinear and in-turned toward deflecting surface 153A of upper surface 153, upper surface 162 of ramp 136 in-turns inwardly toward deflecting surface 153A from trailing end 161 to leading end 160. In other words, ramp 136 is in-turned toward deflecting surface 153A from trailing extremity 161 to leading extremity 160 and, more particularly, upper surface 162 of ramp 136 is in-turned toward deflecting surface 153A from trailing extremity 161 to leading extremity 160.

In the described orientation of base and ramp 135 and 136, side sheets 130 are rigidly affixed to either side of base 135 and ramp 136 via welding. Side sheets 130 are axially aligned, are parallel relative to each other, and extend upright from either side of the respective base 135 and ramp 136 from their respective lower ends 140 and across gap 165 and across base 135 to their respective upper ends 142 that extend upwardly from upper surface 152, and longitudinally across either side of base and ramp 135 and 136 from trailing ends 141 of the respective side sheets 130 at the respective trailing ends 151 and 161 of base and ramp 135 and 136 to leading end 150 of ramp 136 and along base 135 beyond leading end 160 of ramp 136 to the respective leading ends 140 between edge 155 and leading end 150 of upper base section 135, which encloses gap 165 from trailing ends 151 and 161 of base and ramp 135 and 136, respectively, to edge 155 of base 135 and leading end 160 of ramp 136, and between lower surface 153 of base 153 and upper surface 162 of ramp 136, to form channel 170 in FIG. 6 of seed boot 51 that extends forwardly through seed boot 51 from inlet 171 of seed boot 51, defined by and between trailing ends 151 and 161 of base and ramp 135 and 136 and side sheets 130 extending thereacross, to outlet 172 of seed boot 51 under and opposing deflecting surface 153A of lower surface 153 of base 135, outlet 172 being defined by and between edge 155 of base 135 and rearwardly spaced-apart leading end 160, an edge, of ramp 136 and side sheets 130 extending thereacross.

Figure 7:
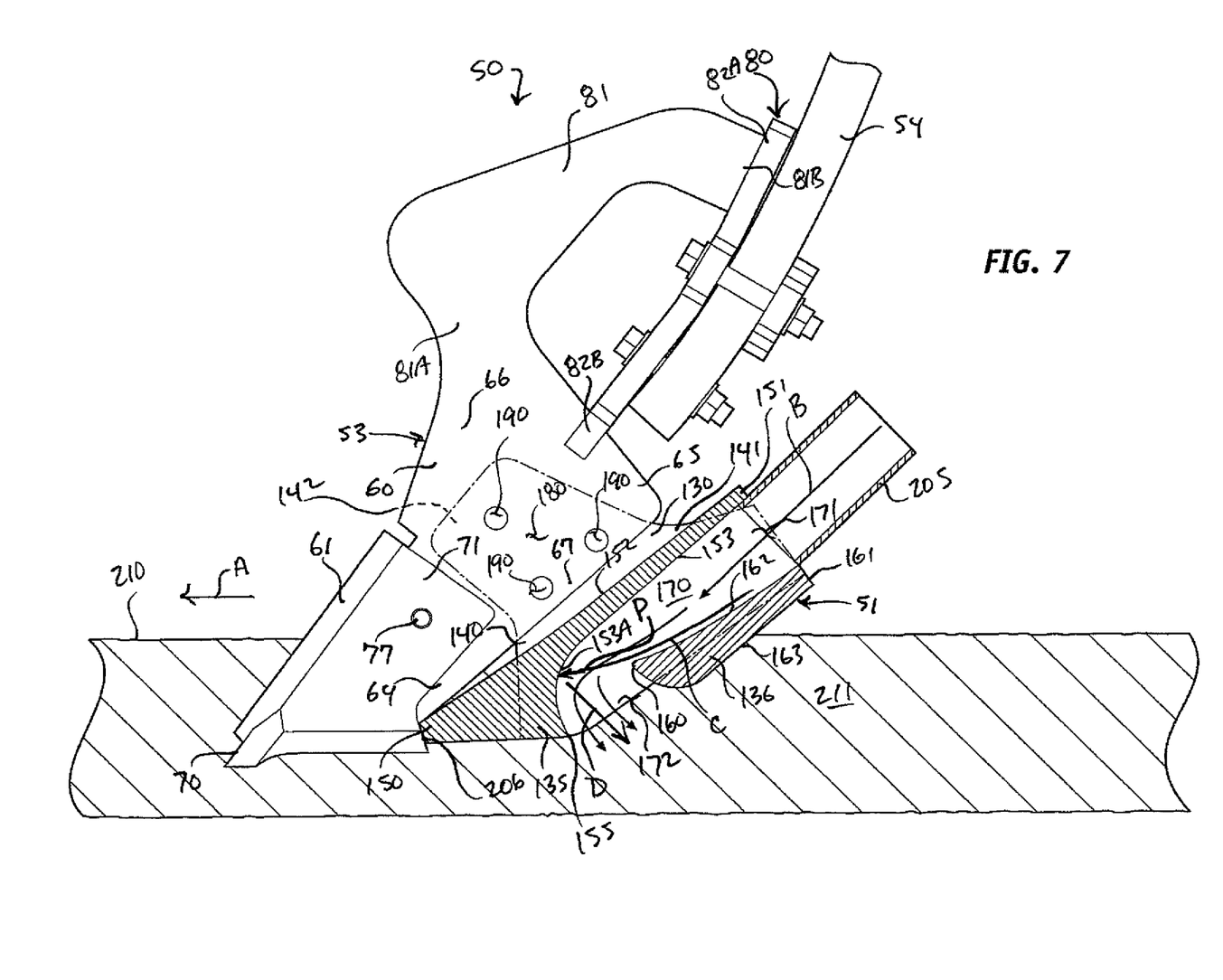
FIG. 7 is a left side elevation view of the embodiment of FIGS. 1 and 2 with portions of the seed boot of the agricultural seeder implement broken away for illustrative purposes.

Referring in relevant part to FIGS. 1, 2, and 7, in implement 50 seed boot 51 is removably connected directly to opener 53 and, more particularly, directly to plate 60 of opener 53. Seed boot 51 is removably connected to plate 60 to be suspended from plate 60. Seed boot 301 extends rearwardly along lower extremity 67 of plate 60 from leading end 150 of base 135 behind cutting head 61 connected to leading extremity to leading ends 140 of side sheets 330 behind leading end 150 and cutting head 61 to trailing ends 141 of side sheets 130 and trailing ends 151 and 161 of base and ramp 135 and 136 behind trailing extremity 65 of plate 60 of opener 53 in the assembly of implement 50. Specifically, seed boot 51 is aligned under lower extremity 67 of plate 60 behind cutting head 61 to align a length of lower extremity 67 of plate 60, from trailing extremity 65 to proximate to leading extremity 64 just behind cutting head 61, with gap 180, shown in FIGS. 1-7, between upper ends 142 of side sheets 130 extending upwardly from upper surface 152 of base 135 between leading ends 140 and trailing ends 141 of side sheets 130. The described length of lower extremity 67 of plate 60, from trailing extremity 65 to proximate to leading extremity 64 just behind cutting head 61, is inserted into gap 180 of seed boot 51 between upper ends 142 of side sheets 130 to locate upper ends 142 of side sheets 130 extending upwardly from upper surface 152 of base 135 on either side of plate 60 aligning holes 190 (FIGS. 3 and 4) formed in plate 60 with corresponding holes 200 (FIGS. 3, 4, and 7) formed in upper end 142 of each side sheet 130. The holes 190 in plate 60 are between leading and trailing extremities 64 and 65, and are between upper and lower extremities 66 and 67. In this example, plate 60 has three holes 190, and each side sheet 130 has three corresponding holes 200. Nut-and-bolt assemblies 84E, 84F, and 84F are applied to the appropriate sets of aligned holes 190 and 200, and are conventionally tightened thereby securing boot 51 to plate 60 of opener 53. The described fastening of boot 51 to plate 60 of opener 53 via nut-and-bolt assemblies 84 firmly and removably/releasably connects boot 51 to plate 60 of opener 53 to suspend boot 51 from plate 60 of opener 53 in FIGS. 1 and 2. To detach boot 51 from plate 60 of opener 53, such as for repair, maintenance, or replacement, the described operation of connecting boot 51 to plate 60 of opener 53 need only be reversed.

The described connection of seed boot 51 to plate 60 of opener 53 is a non-destructive releasable or removably coupling, which allows seed boot 51 to be removed from plate 60 for replacement or repair by reversing the installation operation, without the need to destroy seed boot 51 or plate 60 in the detaching process. Although nut-and-bolt assemblies are used to secure boot 51 to plate 60 of opener 53, conventional spring pins, such as the previously described spring pin 77, can be applied to the appropriate sets of aligned holes 190 and 200 in an alternate embodiment to secure boot 51 to plate 60 of opener 53.

With seed boot 51 so installed on plate 60 of opener 53, seed boot 51 is suspended from plate 60 under lower extremity 67 of plate 60 as shown in FIG. 7. Seed boot 51 extends from inlet 171 located at the trailing end of seed boot 51 behind trailing extremity 65 of plate 60 to the leading end of seed boot 51 at leading end 150 of base 135 just behind cutting head 61 connected to leading extremity 64 of plate 60. Conduit 205 extends into inlet 171 and extends upright and rearwardly therefrom. Base 135, in turn, extends forwardly under lower extremity 67 of plate 60 from trailing end 151 behind trailing extremity 65 of plate 60 to leading end 150 in direct contact against a trailing surface 206 of cutting head 61. Ramp 136, in turn, extends forwardly under lower surface 153 from trailing end 161 behind trailing extremity 65 of plate 60 to leading end 150 to the rear of edge 155 and deflecting surface 153A of base 135. Channel 170 extends forwardly through seed boot 51 from inlet 171 behind trailing extremity 65 of plate 60 to outlet 172 between the trailing and leading extremities of seed boot 51 behind cutting head 61 attached to leading extremity 64 of plate 60 of seed boot 51. Outlet 172, being defined by and between edge 155 of base 135 and rearwardly spaced-apart leading end 160 of ramp 136 and side sheets 130 extending thereacross, is pointed downwardly from seed boot 51 between the leading and trailing extremities of seed boot 51 so as to be pointed downwardly into a furrow cut by opener 53 in the use of implement 50 for sowing a crop.

And so implement 50 includes seed boot 51 connected directly to opener 53 having a leading extremity, consisting of leading extremity 70 of cutting head 61, and a trailing extremity, consisting of trailing extremity 65 of plate 60. Seed boot 51 has channel 170 and outlet 172, and channel 170 extends forwardly from inlet 171 of seed boot 51 proximate to the trailing extremity of opener 53 defined as trailing extremity 65 of plate 60 to outlet 172 behind cutting head 61 and, moreover, behind leading extremity of opener 53 defined as leading extremity 70 of cutting head 61. In FIGS. 1 and 2 illustrating implement 50 assembled and suspended from shank 54, opener 53 is connected to directly to shank 54. Opener 53 depends downwardly from shank 54 to seed boot 51 located behind cutting head 61 of opener 53 and under opener 53.

In use with reference to FIG. 7, implement 50 is suspended from shank 54, and shank 54, in turn, is conventionally connected to a plow frame that is pulled by a tractor for pulling opener 53 at a preselected depth through surface 210 of the ground in a direction of arrowed line A from leading extremity 70 of cutting head 61 of opener 53 to the trailing extremity of opener 53 and the trailing end of seed boot 51 for cutting furrow 211 in the ground beneath surface 210 ahead of seed boot 51 by leading extremity 70 of cutting head 61 that, in turn, defines the leading extremity of opener 53. Seeds are conventionally conveyed by an air stream from a seed hopper to conduit 205 in the direction of arrowed line B, which conveys such stream of air-driven seeds into channel 170 through inlet 171. Channel 170 is for guiding the stream of air-driven seed forwardly through channel 170 in the direction of arrowed lines B in FIG. 7 from inlet 171 and into furrow 211 through outlet 172, which is directed downwardly in furrow 211. Channel 170 is downturned proximate to outlet 172 by deflecting surface 153A of base 135 that curves downwardly to edge 155 at the leading side of outlet 172. This described downturn of channel 172 is for guiding the stream of air-driven seed downwardly into furrow 211 through outlet 172 that points downwardly toward the bottom of furrow 211.

Being formed with ramp 136, channel 170 is a ramped seed-conveying channel. To enable a more aggressive, effective, and consolidated application of the air-driven seed downwardly into furrow 211 from outlet 172, when the air-driven seed is blow through channel 170, the ramped seed-conveying channel 170 of seed boot 51, from inlet 171 in the direction of arrowed line B the air driven seed is inherently driven over upper or ramp surface 162 of ramp 136. In FIG. 7, upper surface 162 of ramp 136 is, as described, curvilinear and in-turned toward deflecting surface 153A of upper surface 153, in which upper surface 162 in-turns inwardly or otherwise ramps toward deflecting surface 153A from trailing end 161 to leading end 160 along a plane P in FIG. 6 that intersects deflecting surface 153A, wherein upper surface 162 of ramp 136 deflects the stream of air-driven seed thereover through channel 170 in the direction of arrowed line B along curvilinear line C that inherently follows plane P to deflecting surface 153A of upper surface 153 away from outlet 170 and, in response, deflecting surface 153A of upper surface 153, which is downwardly curved toward outlet 172 and opposes and is in the line-of-sight outlet 172, automatically deflects the stream of air-driven seed received from the upper surface 162 of ramp 136 downwardly in the direction of arrowed line D to and through outlet 172 into the furrow to provide a focused, aggressive, and consolidated application of the seed into the furrow thereby limiting seed scattering from furrow 211 and resultant loss while improving seed application to furrow 211, in accordance with the principle of the invention.

According to the principle of the invention, agricultural seeder implement 50 is disclosed, which includes opener 53 and seed boot 51. Opener includes leading extremity 70 and trailing extremity 65. Seed boot 51 is connected to opener 53, and includes channel 170 extending forwardly through seed boot 51 from inlet 171 proximate to trailing extremity 65 of opener 53 to outlet 172 behind leading extremity 70 of opener 53, a deflecting surface 153A facing downwardly into channel 170 opposing outlet 172, and ramp 136 facing inwardly into channel 170 between inlet 171 and outlet 172. Opener 53 is for being pulled for cutting furrow 211 in the ground by leading extremity 70 ahead of outlet 172 and channel 170 for guiding a stream of air-driven seed forwardly therethrough from inlet 171 and into furrow 211 through outlet 172 directed downwardly in furrow 211, wherein ramp 136 is in-turned toward deflecting surface 153A for deflecting the stream of air-driven seed through channel 170 inwardly to deflecting surface 153A away from outlet 172, and deflecting surface 153A is for automatically deflecting the stream of air-driven seed received from ramp 136 downwardly to and through outlet 172 into furrow 211, according to the invention. Seed boot 51 is removably connected to opener 53, opener 53 is a chisel, and channel 170 is downturned proximate to outlet 172 for guiding the stream of air-driven seed downwardly into furrow 211 through outlet 172.

In another aspect, agricultural seeder implement 50 includes opener 53 and seed boot 51, opener 53 includes leading extremity 70 and trailing extremity 65, and seed boot 51 is connected to opener 53. In this embodiment, seed boot 51 includes inlet 171 proximate to trailing extremity 65 of opener 51 and outlet 172 behind leading extremity 70 of opener 51, a first surface, lower surface 153, and an opposed second surface, upper surface 162, that extend from inlet 171 to outlet 172. First and second surfaces 153 and 162 define channel 170 through seed boot 51 from inlet 171 to outlet 172. Opener 53 is for being pulled for cutting furrow 211 in the ground by leading extremity 70 ahead of outlet 172 and channel 170 for guiding a stream of air-driven seed forwardly therethrough from inlet 171 and into furrow 211 through outlet 172 directed downwardly in furrow 211, wherein second surface 162 is in-turned toward a deflecting surface 153A of first surface 153 for deflecting the stream of air-driven seed through channel 170 inwardly to deflecting surface 153A away from outlet 172, and deflecting surface 153A of first surface 153 is for automatically deflecting the stream of air-driven seed received from second surface 162 downwardly to and through outlet 172 into furrow 211, according to the invention. First surface 162 extends from inlet 171 to a first edge 155, second surface 162 extends from inlet 171 to a second edge 160, and first edge 155 and second edge 160 define outlet 172. As before, seed boot 51 is removably connected to opener 53, opener 53 is a chisel, and channel 170 is downturned proximate to outlet 172 for guiding the stream of air-driven seed downwardly into furrow 211 through outlet 172.

The above discussion is limited to the operation of one implement 50. Those having regard for the art will readily appreciate that a plow frame can incorporate ten, twenty, thirty, forty, fifty or more such concurrently operating implements 50 to provide the concurrent seeding and fertilizing of numerous furrows.

The present invention is described above with reference to illustrative embodiments. However, those skilled in the art will recognize that changes and modifications can be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. An agricultural seeder implement, comprising:
a seed boot connected to an opener including a leading extremity and a trailing extremity, the seed boot including a channel extending forwardly through the seed boot from an inlet proximate to the trailing extremity to an outlet behind the leading extremity, a deflecting surface between the inlet and the outlet, the deflecting surface facing into the channel and opposing the outlet, and a ramp surface between the inlet and the outlet, the ramp surface facing into the channel, residing along a plane, and ramping inwardly into the channel away from the outlet and toward the deflecting surface along the plane in a direction from the inlet, the plane intersecting the deflecting surface between the inlet and the outlet.

2. The agricultural seeder implement according to claim 1, wherein the seed boot is removably connected to the opener.

3. The agricultural seeder implement according to claim 1, wherein the opener is a chisel.

4. The agricultural seeder implement according to claim 1, wherein the channel downturns to the outlet from the deflecting surface.

5. A seed boot configured to be connected to an agricultural opener, the seed boot comprising:
an inlet, an outlet, a channel extending forwardly through the seed boot from the inlet to the outlet, a deflecting surface between the inlet and the outlet, the deflecting surface facing into the channel and opposing the outlet, and a ramp surface between the inlet and the outlet, the ramp surface facing into the channel, residing along a plane, and ramping inwardly into the channel away from the outlet and toward the deflecting surface along the plane, the plane intersecting the deflecting surface between the inlet and the outlet.

6. The seed boot according to claim 5, wherein the channel downturns to the outlet from the deflecting surface.

7. The agricultural seeder implement according to claim 1, wherein the ramp surface is inwardly curved.

8. The seed boot according to claim 5, wherein the ramp surface is inwardly curved.

9. An agricultural seeder implement, comprising:
an opener including a leading extremity and a trailing extremity;
a seed boot connected to the opener, the seed boot comprising:
a channel extending forwardly through the seed boot from an inlet proximate to the trailing extremity to an outlet behind the leading extremity;
a deflecting surface between the inlet and the outlet, the deflecting surface facing into the channel and opposing the outlet; and
a ramp comprising a trailing end proximate to the inlet, a leading end proximate to the outlet and spaced apart rearwardly from the deflecting surface, and a ramp surface between the trailing end and the leading end, the ramp surface facing into the channel, residing along a plane, and ramping into the channel away from the outlet and toward the deflecting surface along the plane from the trailing end to the leading end, the plane extending from the leading end toward and intersecting the deflecting surface between the inlet and the outlet.

10. The agricultural seeder implement according to claim 9, wherein the seed boot is removably connected to the opener.

11. The agricultural seeder implement according to claim 9, wherein the opener is a chisel.

12. The agricultural seeder implement according to claim 9, wherein the channel downturns to the outlet from the deflecting surface.

13. The agricultural seeder implement according to claim 9, wherein the ramp surface is inwardly curved.

14. A seed boot configured to be connected to an agricultural opener, the seed boot comprising:
an inlet;
an outlet;
a channel extending forwardly through the seed boot from the inlet to the outlet;
a deflecting surface between the inlet and the outlet, the deflecting surface facing into the channel and opposing the outlet; and
a ramp comprising a trailing end proximate to the inlet, a leading end proximate to the outlet and spaced apart rearwardly from the deflecting surface, and a ramp surface between the trailing end and the leading end, the ramp surface facing into the channel, residing along a plane, and ramping into the channel away from the outlet and toward the deflecting surface along the plane from the trailing end to the leading end, the plane extending from the leading end toward and intersecting the deflecting surface between the inlet and the outlet.

15. The seed boot according to claim 14, wherein the channel downturns to the outlet from the deflecting surface.

16. The seed boot according to claim 14, wherein the ramp surface is inwardly curved.

* * * * *